United States Patent
Jo et al.

(10) Patent No.: US 8,320,506 B2
(45) Date of Patent: Nov. 27, 2012

(54) UNIVERSAL BLIND MODE DETECTOR, GUARD MODE DETECTOR OF THE UNIVERSAL BLIND MODE DETECTOR, AND METHOD OF DETECTING UNIVERSAL BLIND MODE

(75) Inventors: Yung-Hoon Jo, Kyungki-do (KR); Ki Cheol Jeong, Seoul (KR)

(73) Assignee: Core Logic, Inc., Seoul (KR)

( * ) Notice: Subject to any disclaimer, the term of this patent is extended or adjusted under 35 U.S.C. 154(b) by 697 days.

(21) Appl. No.: 12/427,678

(22) Filed: Apr. 21, 2009

(65) Prior Publication Data

US 2009/0262849 A1    Oct. 22, 2009

(30) Foreign Application Priority Data

Apr. 21, 2008  (KR) .................. 10-2008-0036742

(51) Int. Cl.
    H04L 27/06    (2006.01)
(52) U.S. Cl. ..................... 375/340; 375/345
(58) Field of Classification Search .......... 375/260, 375/316, 340, 345
    See application file for complete search history.

(56) References Cited

U.S. PATENT DOCUMENTS

| | | | |
|---|---|---|---|
| 7,386,063 B1* | 6/2008 | Husted | 375/316 |
| 2006/0034397 A1* | 2/2006 | Lee et al. | 375/340 |
| 2006/0227908 A1* | 10/2006 | Scharf et al. | 375/346 |
| 2007/0155344 A1* | 7/2007 | Wiessner et al. | 455/78 |
| 2008/0013651 A1* | 1/2008 | Taya | 375/344 |
| 2008/0119153 A1* | 5/2008 | Sugiyama et al. | 455/245.1 |
| 2010/0290561 A1* | 11/2010 | Ko et al. | 375/298 |

FOREIGN PATENT DOCUMENTS

KR    10-2008-0007090 A    1/2008

* cited by examiner

*Primary Examiner* — Shuwang Liu
*Assistant Examiner* — David Huang
(74) *Attorney, Agent, or Firm* — Nath, Goldberg & Meyer; Jerald L. Meyer; Stanley N. Protigal

(57) ABSTRACT

Provided are a universal blind mode detector capable of universally detecting not only various orthogonal frequency division multiplexing (OFDM) communication services but also non-OFDM communication services, and a fast Fourier transform (FFT) mode detector, a guard mode detector, and a memory sharing structure of the universal blind mode detector, and a method of detecting a universal blind mode. The universal blind mode detector includes a radio frequency (RF) tuner converting a received signal into a baseband frequency signal, an automatic gain control (AGC) unit which is connected to the RF tuner and determines existence of a communication service by referring to a received signal strength indication (RSSI), a communication service mode detection unit determining of which scheme a communication service mode signal is if the AGC unit determines that there is the communication service, and detecting the communication service mode signal, and a channel decoding unit detecting the detected signal.

13 Claims, 7 Drawing Sheets

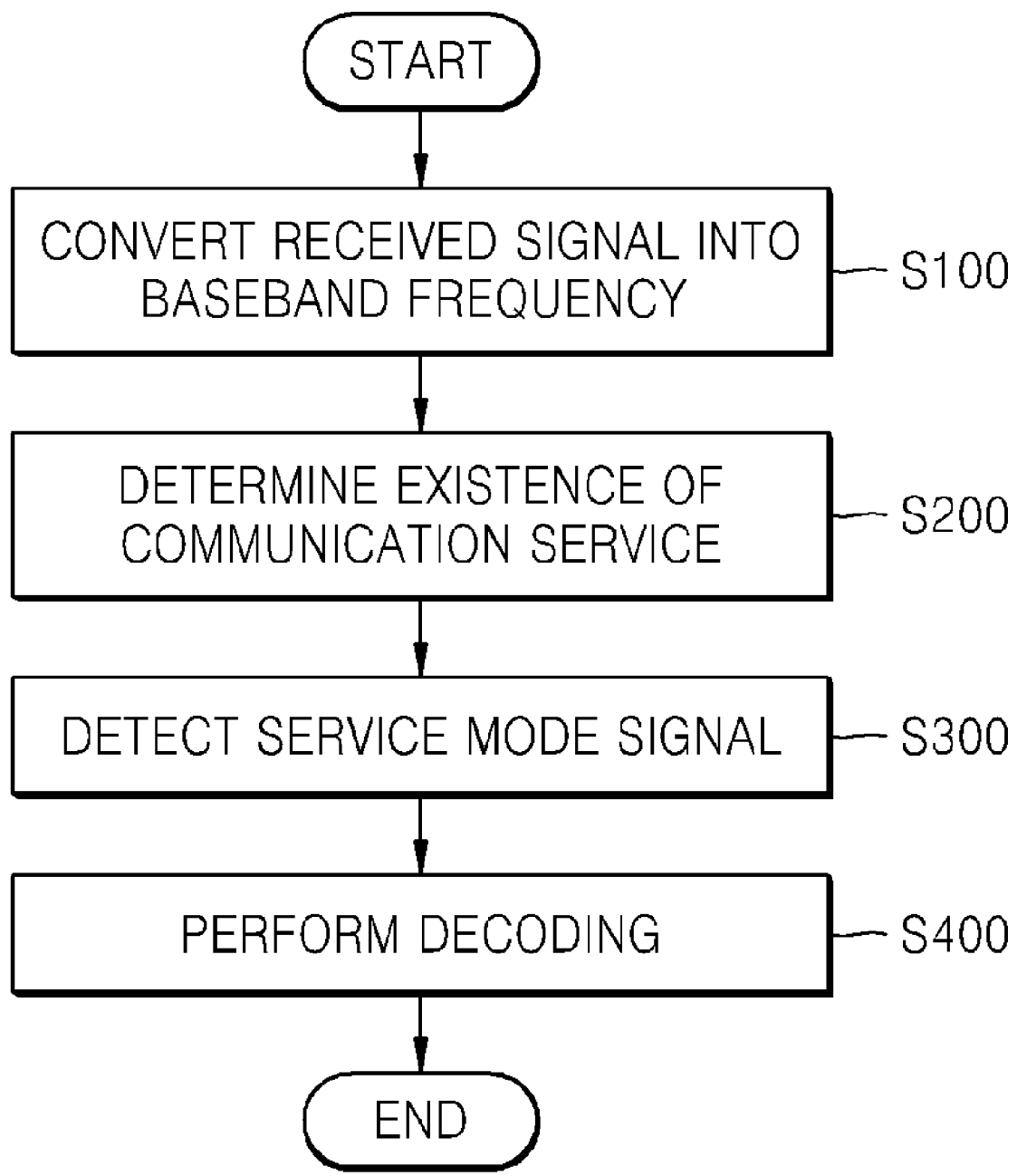

UNIVERSAL BLIND MODE DETECTOR, GUARD MODE DETECTOR OF THE UNIVERSAL BLIND MODE DETECTOR, AND METHOD OF DETECTING UNIVERSAL BLIND MODE

CLAIM OF PRIORITY

This application claims the benefit of Korean Patent Application No. 10-2008-0036742, filed on Apr. 21, 2008, in the Korean Intellectual Property Office, the disclosure of which is incorporated herein in its entirety by reference.

BACKGROUND

The present disclosure relates to a wireless communication signal detector, and more particularly, to a detector capable of universally detecting all broadcasting services including an orthogonal frequency division multiplexing (OFDM) scheme.

An orthogonal frequency division multiplexing (OFDM) scheme, which has been used as a useful scheme for high-speed data transmission in a wired/wireless channel, is a data transmission scheme using a plurality of carriers in which serially input data are converted in parallel, the respective converted data are modulated with a plurality of mutually orthogonal sub-carriers, that is, a plurality of mutually orthogonal sub-channels, and they are then transmitted.

The OFDM scheme is now widely being applied to such digital transmission technology as digital audio broadcasting (DAB), digital television (DTV), wireless local area network (WLAN), wireless asynchronous transfer mode (WATM), broadband wireless access (BWA), and so forth. The OFDM scheme, which was not widely used due to its hardware complexity, can now be implemented owing to the recent development of various digital signal processing technologies including fast Fourier transform (FFT) and inverse fast Fourier transform (IFFT). The OFDM scheme, being similar to a conventional frequency division multiplexing (FDM) scheme, is characterized by transmitting a plurality of sub-carriers while maintaining orthogonality therebetween, thereby obtaining the optimal transmission efficiency during high-speed data transmission. In addition, the OFDM scheme has high frequency efficiency and is robust against multipath fading. Moreover, the OFDM scheme is robust against frequency selective fading by using a superimposed frequency spectrum, can reduce the effects of inter-symbol interference with the use of a guard interval, can enable simple hardware design of an equalizer, and is robust against impulse noises.

At present, as mentioned above, the field of communication systems using the OFDM scheme is being developed variously. However, since the communication systems provide services by employing detectors or receivers suitable for their respective characteristics, corresponding detectors are required for reception of various OFDM signal services. Accordingly, there is a need for a universal blind mode detector capable of universally receiving all signal services using the OFDM scheme.

For non-OFDM communication systems which use satellite-digital multimedia broadcasting (S-DMB) and direct sequence-ultra wideband (DS-UWB) instead of the OFDM scheme, there is an attempt for unification based on a feature that they use Viterbi (VIT) or Reed Solomon decoders (RSDs) which are also used in OFDM systems.

SUMMARY

The present disclosure provides a universal blind mode detector capable of universally detecting non-OFDM communication services as well as OFDM communication services, and a fast Fourier transform (FFT) mode detector, a guard mode detector, and a memory sharing structure of the universal blind mode detector, and a method of detecting a universal blind mode.

According to an aspect of the present disclosure, there is provided an universal blind mode detector including a radio frequency (RF) tuner converting a received signal into a baseband frequency signal, an automatic gain control (AGC) unit which is connected to the RF tuner and determines existence of a communication service by referring to a received signal strength indication (RSSI), a communication service mode detection unit determining of which scheme a communication service mode signal is if the AGC unit determines that there is the communication service, and detecting the communication service mode signal, and a channel decoding unit detecting the detected signal.

In the present disclosure, the communication service mode detection unit may include a bandwidth detection unit detecting a bandwidth of the received signal, a fast Fourier transform (FFT) mode detection unit detecting an FFT mode for the received signal, and a guard mode detection unit which is connected to the FFT mode detection unit and detects a guard mode. The bandwidth detection unit may detect the bandwidth by accumulating an output of a sliding mean with respect to a signal undergoing FFT and determine a signal scheme. The bandwidth detection unit may include an absolute calculation unit calculating an absolute value of an FFT output signal, a sliding mean calculating a mean of an output signal of the absolute calculation unit, an FFT length accumulation unit accumulating an output of the sliding mean, and a bandwidth mode detection unit detecting a bandwidth based on a result of the FFT length accumulation unit.

In the present disclosure, the FFT mode detection unit may perform conjugate complex multiplication and accumulation on symbols stored in serial-connected storage devices (memory), and then detect a maximum value, thereby detecting the FFT mode corresponding to a symbol size. The guard mode detection unit may detect a guard mode corresponding to a guard symbol size through parallel-connected storage devices (memory), and thus the guard mode detection unit may set a symbol timing offset (STO) to a predetermined value, assume that lengths of input symbols are uniform, sum the symbols in an STO part with memory sizes of parallel-connected storage devices (memory), and then detect a maximum value, thereby detecting the guard mode corresponding to a symbol size.

In the present disclosure, the universal blind mode detector may include a transmission unit for transmitting a transmission signal, and the transmission unit may include a channel modulation unit modulating the transmission signal, and an orthogonal frequency division multiplexing (OFDM) unit for transmitting the signal modulated by the channel modulation unit according to an OFDM scheme, which includes an OFDM generation unit for performing signal modulation according to the OFDM scheme and a pulse generation unit for generating a clock signal.

In the present disclosure, the universal blind mode detector may include a plurality of detection units and estimation units for detecting received signals, and the plurality of detection units and estimation units share a single memory for use as a storage device.

In the present disclosure, the FFT mode detector may include at least two storage devices which are serially connected and store a received signal, conjugate complex multiplication units of a number corresponding to the storage devices, which perform conjugate complex multiplication on output signals stored in the storage devices and the received signal, accumulation units which are connected to the respective conjugate complex multiplication units and accumulate outputs of the respective conjugate complex multiplication units, and a maximum value detection unit detecting a maximum value of outputs of the accumulation units.

In the present disclosure, a maximum memory size which is a sum of memory sizes of the storage devices is larger than or equal to a maximum symbol size that can be input as the received signal. For example, the number of storage devices is 4, each having a memory size capable of storing 2048 samples, i.e., 2K samples. If these storage devices are provided, the received signal can be stored in the storage devices of a number corresponding to a symbol size.

According to another aspect of the present disclosure, there is provided a guard mode detector including at least two first storage devices which are connected in parallel and store at least two input first signals, respectively, absolute calculation units which are connected to the respective first storage devices and calculate absolute values by calculating a sliding mean of a subsequently input first signal and the first signal stored in the first storage devices by means of an adder, second storage devices which are connected to the respective absolute calculation units and store outputs of the absolute calculation units to accumulate the absolute values, and a maximum detection unit detecting a maximum value among signals being output by accumulation of signals stored in the second storage devices, in which the guard mode detector detects a guard mode corresponding to a size of a guard symbol of a received signal.

In the present disclosure, the first signal may be a signal being output from each of at least two conjugate complex multiplication units included in a fast Fourier transform (FFT) mode detector which detects an FFT mode by using serial-connected storage devices. The maximum value detection unit may include a symbol timing offset (STO) estimation device which estimates an STO for the accumulated output signals. The number of first storage devices may be 4, the 4 first storage devices may have different memory sizes, and the respective second storage devices may have memory sizes which are larger by a predetermined memory size than memory sizes of the respective first storage devices.

According to another aspect of the present disclosure, there is provided a method of detecting a universal blind mode. The method includes converting a signal received by a radio frequency (RF) tuner into a baseband frequency signal, determining existence of a communication service by referring to a received signal strength indication (RSSI) at an automatic gain control (AGC) unit connected to the RF tuner, if the AGC unit determines that there is the communication service, determining of which scheme a communication service mode signal is and detecting the communication service mode signal at a communication service mode detection unit, and decoding the detected signal at a channel decoding unit.

In the present disclosure, the detecting of the communication service mode signal may include detecting a bandwidth of a received signal at a bandwidth detection unit, determining of which communication service scheme the received signal is at a host, and detecting an FFT mode and a guard mode with respect to the received signal at an FFT mode detection unit and a guard mode detection unit.

BRIEF DESCRIPTION OF THE DRAWINGS

The above and other features and advantages of the present disclosure will become more apparent by describing in detail exemplary embodiments thereof with reference to the attached drawings in which:

FIG. 8 is a flowchart illustrating a method of detecting a universal blind mode according to another embodiment of the present disclosure.

DETAILED DESCRIPTION

Figure 1:
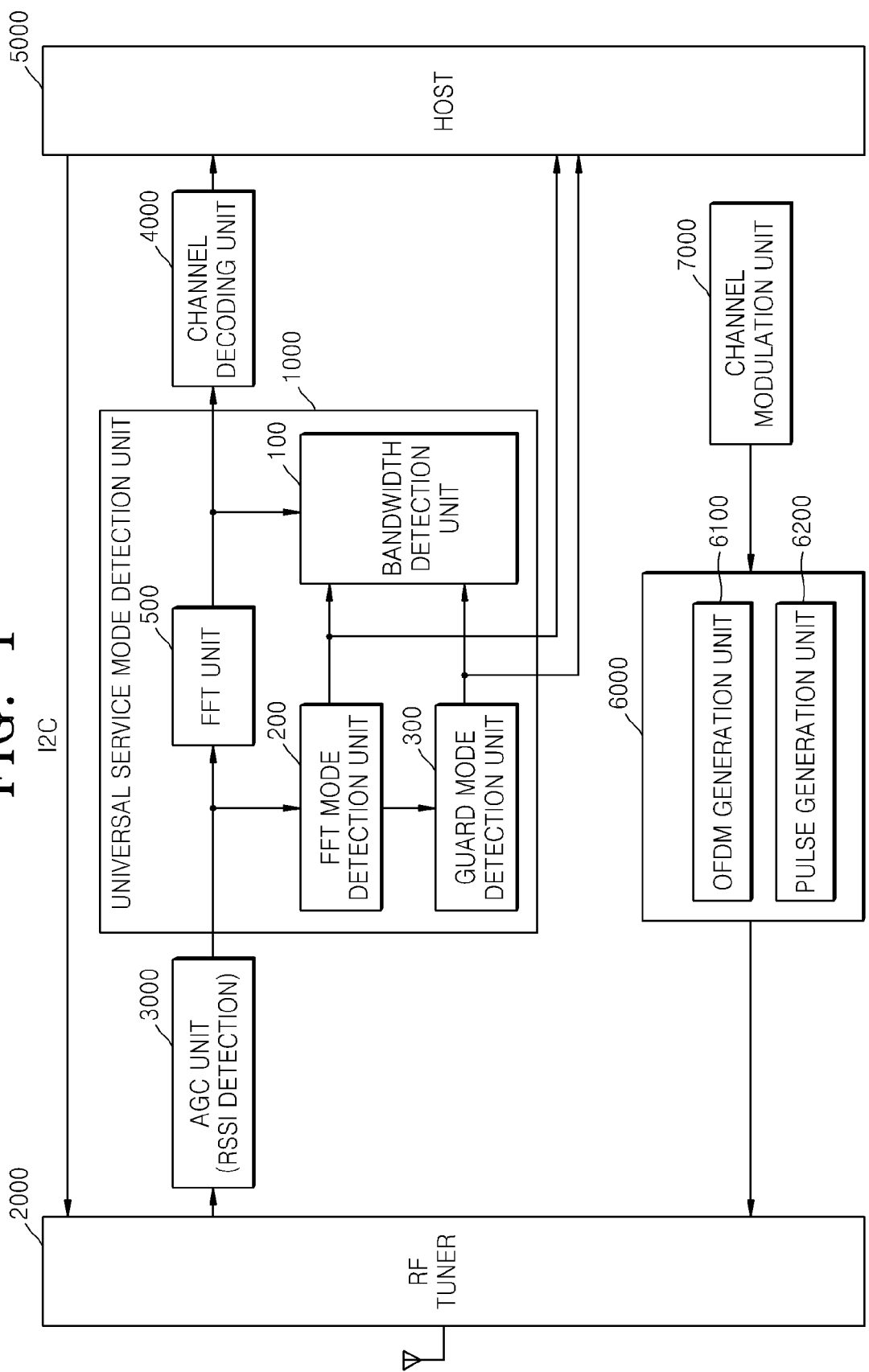
FIG. 1 is a block diagram of a universal blind mode detector according to an embodiment of the present disclosure.

Hereinafter, exemplary embodiments of the present disclosure will be described in detail with reference to the accompanying drawings. In the following description, when it is described that an element is connected to another element, it may be connected directly to another element, but a third element may also be interposed therebetween. Additionally, in the drawings, the structure or size of each element is exaggerated for convenience and clarity of illustration and portions unrelated to description are omitted. Like reference numerals indicate like elements throughout the drawings. Terms used therein are used only for illustrative purposes and are not intended to limit the scope of the present disclosure defined in the claims.

In the field of OFDM communication systems, a steady effort has been made to unify receiver structures as previously mentioned. In the current market, broadcast reception and WLAN are firmed up, in which terrestrial-digital multimedia broadcasting (T-DMB) and digital video broadcasting-handheld (DVB-H) are being studied for broadcast reception chips and 802.1a/b/g/n universal chips are being researched for WLAN. In the meanwhile, research has also been conducted on chips which unify all OFDM systems such as broadcasting and WLAN systems.

Such an OFDM system can be roughly divided into an OFDM (or FFT) unit, a Viterbi (VIT) decoder, a Reed Solomon decoder (RSD), and an MPE-FEC decoder. MPE-FEC can be implemented with software and is used mainly in DVB-H broadcasting. The FFT unit, the VIT decoder, and the RSD decoder are essentially used in all systems such as T-DMB, WLAN, and so forth.

Non-OFDM systems which do not use OFDM, such as S-DMB systems, DS-UWB systems, etc. also use a VIT decoder and an RSD decoder, and their structures that can be shared increase and thus the possibility of their being unified also increases. However, service frequencies currently used in one country are different from those of other countries and different frequencies may be used for the same service. To avoid this problem, there may be one way of improving a detection rate by setting a communication service mode function to be flexible without limiting the mode function to a certain section.

At present, representative systems using a code division multiple access (CDMA) scheme, a pulse scheme, and an OFDM scheme may be a Bluetooth system, an 802.15.4a UWB system, and mobile broadcasting and WLAN/Wireless broadband (Wibro) systems, respectively. Bluetooth, although adopting the CDMA scheme, is tending to be integrated with multiband orthogonal frequency division multiplexing ultra wideband (MB-OFDM UWB) as a single chip, and thus can be regarded as one chip. Pulse UWB, which leads 802.15.4a, generates a separate signal from OFDM, but can generate an impulse signal by setting all OFDM carriers to 1. For this reason, pulse UWB can be implemented without a need for additional logic.

FIG. 1 is a block diagram of a universal blind mode detector according to an embodiment of the present disclosure.

Referring to FIG. 1, the universal blind mode detector according to the current embodiment of the present disclosure includes a radio frequency (RF) tuner 2000, an automatic gain control (AGC) unit 3000, a universal service mode detection unit 1000, a channel decoding unit 4000, and a host 5000.

The RF tuner 2000 converts a received signal into a baseband frequency signal, and the AGC unit 3000 determines existence of a communication service by referring to a received signal strength indication (RSSI). In the current embodiment of the present disclosure, the RF tuner 2000 includes a phase locked loop (PLL) capable of adjusting a central frequency between 0 and 11 GHz and a filter capable of adjusting a bandwidth between 0 and 528 MHz, thus performing a function of converting signals of various schemes into baseband frequency signals.

Once the AGC unit 3000 determines that there is the communication service, the universal service mode detection unit 1000 determines of which scheme a communication service mode signal is and detects the communication service mode signal. The channel decoding unit 4000 performs decoding on signals detected by the universal service mode detection unit 1000. For example, the channel decoding unit 4000 may include a VIT decoder and an RSD decoder.

The host 5000 provides a service required by the entire system for communication. For example, the host 5000 adjusts a PLL value of the RF tuner 2000 such that the central frequency of the RF tuner 2000 can be almost 0 GHz. The host 5000 also determines in which communication service mode a received signal is. That is, after bandwidth detection by a bandwidth detection unit in the universal service mode detection unit 1000, a DS-UWB scheme, a CDMA scheme, and an OFDM scheme are alternately attempted for serviceable signals. Since all systems have their respective unique medium access control (MAC) information and unique transmission/reception modes, they primarily judges a communication service mode in physical layers and then judges the communication service mode based on MAC information extracted by hosts. The judgement of the communication service mode involves searching for a communication service mode and then increasing a central frequency by the bandwidth of the found service to search for a new service.

The universal service mode detection unit 1000 includes a bandwidth detection unit 100, an FFT mode detection unit 200, and a guard mode detection unit 300 and a FFT unit 500. The bandwidth detection unit 100 detects a bandwidth by accumulating an output of a sliding mean with respect to an output signal from FFT unit 500. The bandwidth detection unit 100 may include an absolute calculation unit, the sliding mean, a FFT length accumulation unit, and a bandwidth mode detection unit. The bandwidth detection unit 100 will later be described in more detail with reference to FIGS. 2 and 3. Here, FFT unit 500 perform FFT with respect to an output signal from the AGC unit 3000.

The FFT mode detection unit 200 detects an FFT mode corresponding to a symbol size through serial-connected storage devices (memory), which will later be described in more detail with reference to FIG. 4. The guard mode detection unit 300 is connected to the FFT mode detection unit 200 to detect a guard mode, which will later be described in more detail with reference to FIGS. 5 and 6.

When the universal blind mode detector according to the current embodiment of the present disclosure also serves as a transmitter, it may include a transmission unit for transmitting a transmission signal. The transmission unit may include a channel modulation unit 7000 for modulating a transmission signal, and an OFDM unit 6000 for transmitting a signal modulated by the channel modulation unit 7000 according to the OFDM scheme, which includes an OFDM generation unit 6100 for performing OFDM signal modulation and a pulse generation unit 6200 for generating a pulse signal.

The universal blind mode detector according to the current embodiment of the present disclosure may universally detect signals of various schemes by using a memory sharing structure. In other words, the universal blind mode detector according to the current embodiment of the present disclosure may include a plurality of detection units and estimation units for detecting received signals. The plurality of detection units and estimation units share a single memory and each of the detection units or estimation units uses some of the memory as a storage device of a required capacity. Thus, the universal blind mode detector according to the current embodiment of the present disclosure can remarkably reduce a memory chip size while ensuring detection of various broadcast signals, leading to remarkable reduction in size and price of portable terminals such as mobile phones. Such a memory structure will later be described in more detail with reference to FIG. 7.

Table 1 shows parts which can be unified for currently used broadcast signal communication service modes.

TABLE 1

|  |  | PHY | VIT | RSD | MPE-FEC |
|---|---|---|---|---|---|
| Bluetooth | CDMA | ◯ | | | |
| 802.15.4a | Pulse-UWB | ◯ | ◯ | ◯ | |
| MB-OFDM | OFDM | ◯ | ◯ | ◯ | |
| WLAN | | ◯ | ◯ | ◯ | |
| WIFI | | ◯ | ◯ | ◯ | |
| WIBRO | | ◯ | ◯ | ◯ | |
| DAB | | ◯ | ◯ | ◯ | |
| T-DMB | | ◯ | ◯ | ◯ | ◯ |
| DVB-T/H | | ◯ | ◯ | ◯ | |
| ISDB-T | | ◯ | ◯ | ◯ | |
| M-FLO | | ◯ | ◯ | ◯ | |

As can be seen from Table 1, most communication service modes, except for Bluetooth of a CDMA scheme, can share other PHY, VIT, and RSD parts than a multi-protocol encapsulation—forward error correction (MPE-FEC) part. That is, once only the MPE-FEC part is separately installed for T-DMB, PHY (physical layers), VIT (Viterbi decoders), and RSD (Reed Solomon decoders) can be commonly used. As mentioned above, Bluetooth is integrated with MB-OFDM (UWB) as a single chip.

Therefore, all the communication service modes shown in Table 1 can be detected by the universal blind mode detector according to the current embodiment of the present disclosure. In the following description, elements of the universal blind mode detector will be described in more detail.

Figure 2:
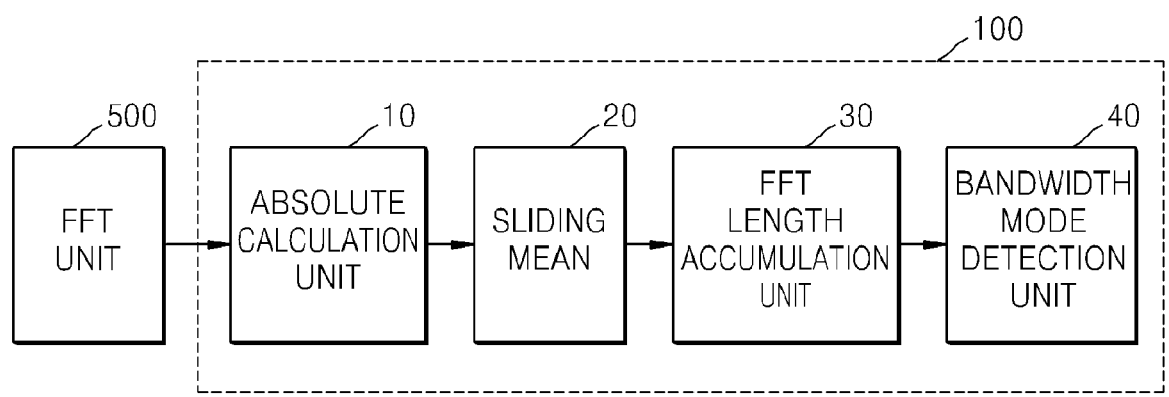
FIG. 2 is a block diagram illustrating in more detail a bandwidth detection unit shown in FIG. 1.

FIG. 2 is a block diagram illustrating in more detail the bandwidth detection unit 100 shown in FIG. 1.

Referring to FIG. 2, the bandwidth detection unit 100 according to the present disclosure includes an absolute calculation unit 10, a sliding mean 20, an FFT length accumulation unit 30, and a bandwidth mode detection unit 40.

The absolute calculation unit 10 calculates an absolute value of an FFT output signal being output from the FFT unit 500, and the sliding mean 20 calculates a sliding mean, i.e., a sliding sum of the amplitude of a signal being output from the absolute calculation unit 10. The FFT length accumulation unit 30 accumulates an output of the sliding mean 20, and the bandwidth mode detection unit 40 detects a bandwidth by referring to an output of the FFT length accumulation unit 30.

Figure 3:
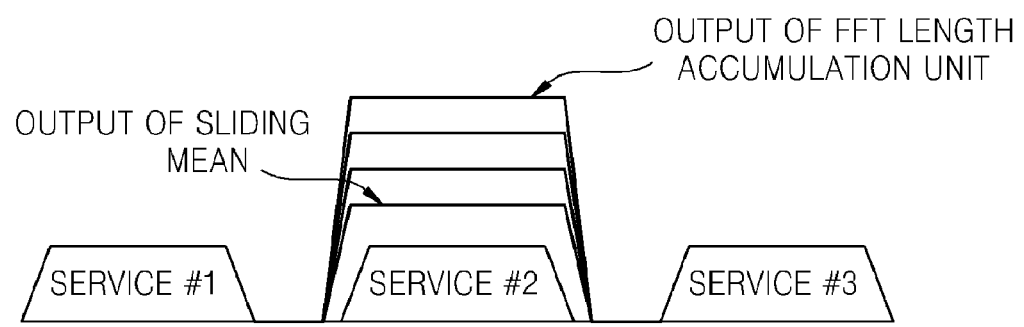
FIG. 3 is a diagram for explaining a method in which the bandwidth detection unit shown in FIG. 2 detects a bandwidth.

In other words, the bandwidth detection unit 100 continuously accumulates a signal being output from the sliding mean 20 to obtain a maximum value, thereby detecting a bandwidth of the received signal. FIG. 3 shows such a method as a diagram.

FIG. 3 is a diagram for explaining a method in which the bandwidth detection unit 100 shown in FIG. 2 detects a bandwidth.

Referring to FIG. 3, if a received signal is Service 2 having a specific bandwidth, a signal being output from the sliding mean 20 is continuously accumulated only in a mode of Service 2, without being accumulated in the other communication service modes. In this way, only the mode of Service 2 has a maximum value and thus a bandwidth of Service 2 can be easily detected.

Figure 4:
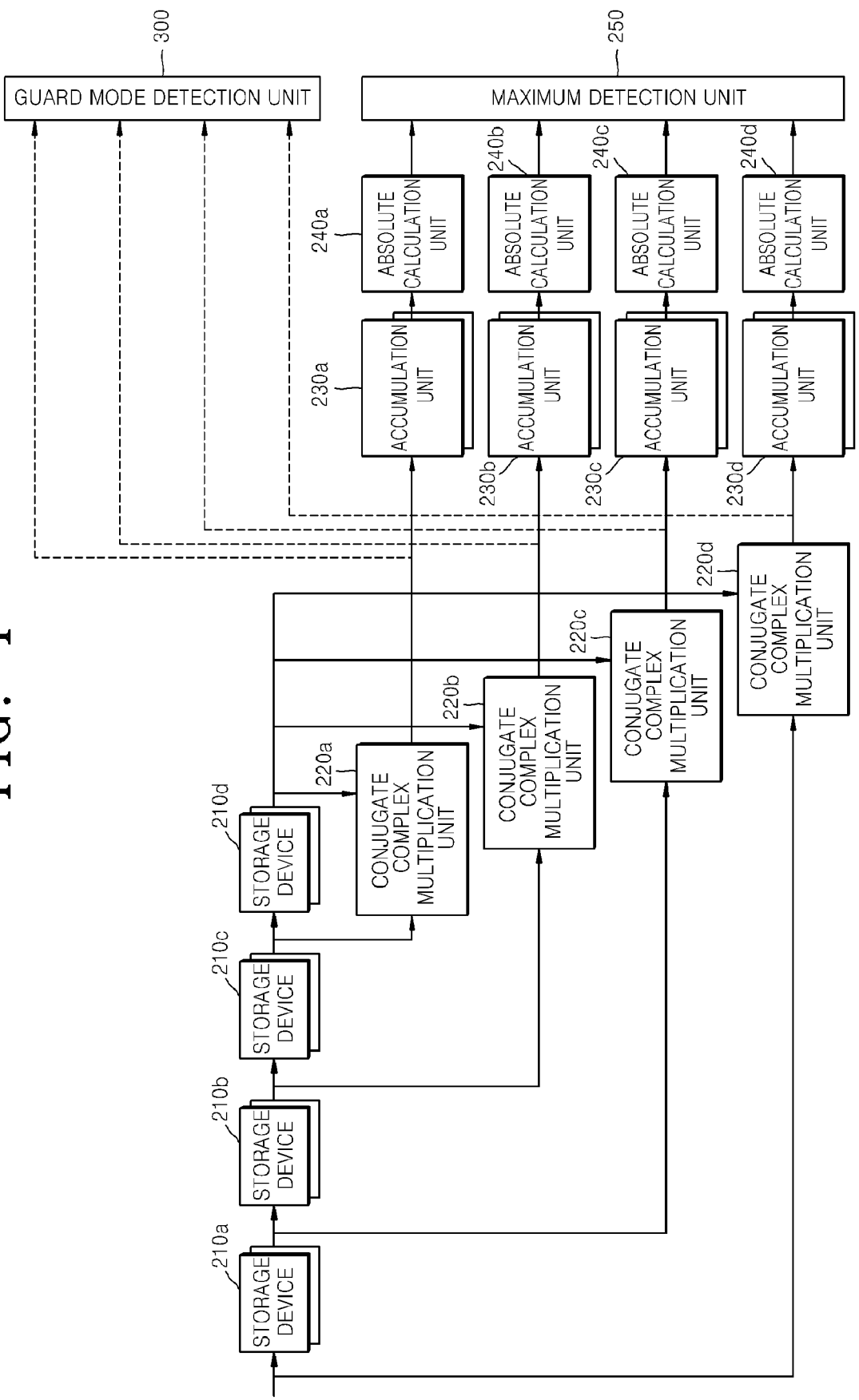
FIG. 4 is a block diagram illustrating in more detail a fast Fourier transform (FFT) mode detection unit shown in FIG. 1.

FIG. 4 is a block diagram illustrating in more detail the FFT mode detection unit 200 shown in FIG. 1.

Referring to FIG. 4, the FFT mode detection unit 200 according to the present disclosure includes four storage devices 210a-210d, conjugate complex multiplication units 220a-220d, accumulation units 230a-230d, absolute calculation units 240a-240d, and a maximum detection unit 250.

The four storage devices 210a-210d are serially connected to one another, each having a memory size capable of storing 2048 samples. Thus, the four storage devices 210a-210d can store a received OFDM signal having a symbol size of 0-8192 samples. In other words, since the four storage devices 210a-210d are serially connected, 2048 samples are stored in one storage device and thus up to 8192 samples can be stored if all the four storage devices 210a-210d are used.

For example, a received signal is stored such that if the received signal has a symbol size of 2048 samples or less, only a fourth storage device 210d is used, and for the symbol size of over 2048 to 4096 samples, both a third storage device 210c and the fourth storage device 210d are used.

Received signals stored in this way are conjugate-complex multiplied in respective corresponding conjugate complex multiplication units 220a-220d and then accumulated in respective corresponding accumulation units 230a-230d. The accumulated signals are subject to absolute value calculation in the absolute calculation units 240a-240d and then a maximum value is detected in the maximum detection unit 250, whereby an FFT mode is detected. For example, if a received signal has a symbol size of 4096 samples, a signal is accumulated only in a second accumulation unit 230b and thus an absolute value in a second absolute calculation unit 240b is a maximum value, thereby detecting a corresponding FFT mode.

Although four storage devices are used in the current embodiment, other numbers and sizes of storage devices can be used according to memory sizes of storage devices and symbol sizes of signals that can be received and serviced. Outputs of the conjugate complex multiplication units 220a-220d and an output of the maximum detection unit 250 are input to the guard mode detection unit 300.

Figure 5:
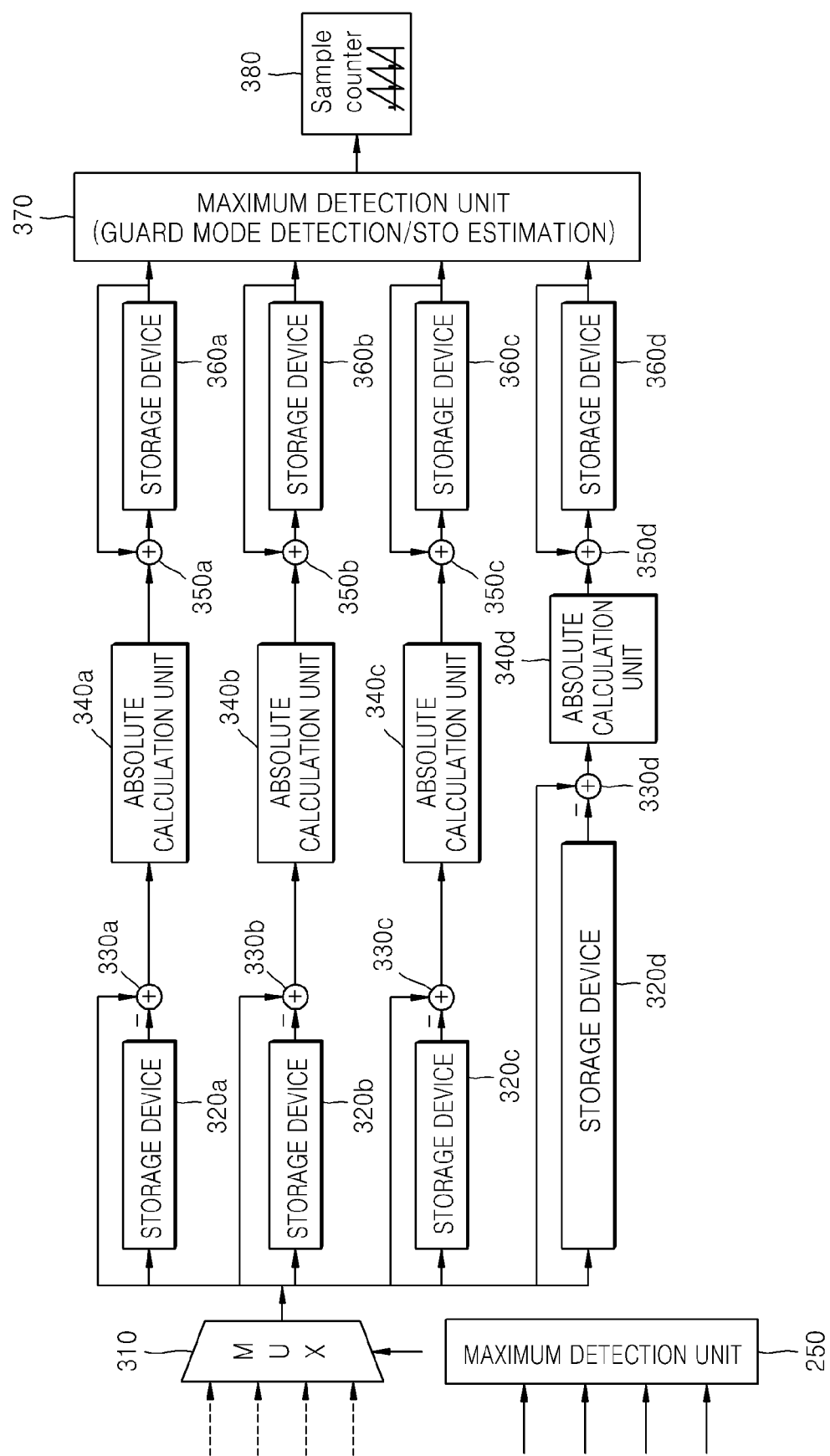
FIG. 5 is a block diagram illustrating in more detail a guard mode detection unit shown in FIG. 1.

FIG. 5 is a block diagram illustrating in more detail the guard mode detection unit 300 shown in FIG. 1.

Referring to FIG. 5, the guard mode detection unit 300 includes a multiplexer (MUX) 310, 4 first storage devices 320a-320d, first adders 330a-330d, absolute calculation units 340a-340d, second adders 350a-350d, second storage devices 360a-360d, and a maximum detection unit 370.

The MUX 310 multiplexes signals being input from the conjugate complex multiplication units 220a-220d of the FFT mode detection unit 200 and inputs the multiplexed signal to the first storage devices 320a-320d and the first adders 330a-330d. The signal being output from the MUX 310 is subject to sliding sum through the first storage devices 320a-320d and the first adders 330a-330d. That is, the first storage devices 320a-320d and the first adders 330a-330d form sliding means. The first storage devices 320a-320d are connected in parallel and have different memory sizes, as shown in FIG. 5. That is, the first storage devices 320a, 320b, 320c, and 320d have different memory sizes capable of storing 256 samples, 512 samples, 1024 samples, and 2048 samples, respectively. Next, the absolute calculation units 340a-340d calculate absolute values of signals being output from the first adders 330a-330d, i.e., the sliding means.

The second adders 350a-350d sum the absolute values and output values of the second storage devices 360a-360d, respectively. The second storage devices 360a-360d receive and store outputs of the second adders 350a-350d, and then input the outputs to the second adders 350a-350d. In other words, the absolute values are accumulated a predetermined number of times in the second storage devices 360a-360d. The maximum detection unit 370 searches for a maximum value for the signals accumulated a predetermined number of times, thereby detecting a corresponding guard mode.

The maximum detection unit 370 also estimates a symbol timing offset (STO). That is, the maximum value detection unit 370 comprises a symbol timing offset (STO) estimation device which estimates an STO for the accumulated output signals using a sample counter 380. The guard mode detection unit 300, after initially estimating a coarse STO, assumes that symbol lengths are uniform, and then sums symbols in an STO part with memory sizes of the first storage devices 310a-310d. Thus, only a corresponding guard symbol fitted to the memory sizes of the first storage devices 310a-310d is accumulated in the estimated STO part and a maximum value is accordingly searched for, thereby detecting a guard mode having a corresponding guard symbol size.

For symbol size detection of the guard mode, the first storage devices 320a-320d are connected in parallel and have different memory sizes, as mentioned above. Symbols stored in the first storage devices 320a-320d having different memory sizes are accumulated in the estimated STO part according to a guard symbol size.

The second storage devices 360a-360d have memory sizes which are larger by a predetermined memory size than those of the first storage devices 320a-320d. For example, the second storage devices 360a-360d may have memory sizes corresponding to (the first storage device 320a+8192 samples), (the first storage device 320b+8192 samples), (the first storage device 320c+8192 samples), and (the first storage device 320d+8192 samples), respectively.

Figure 6:
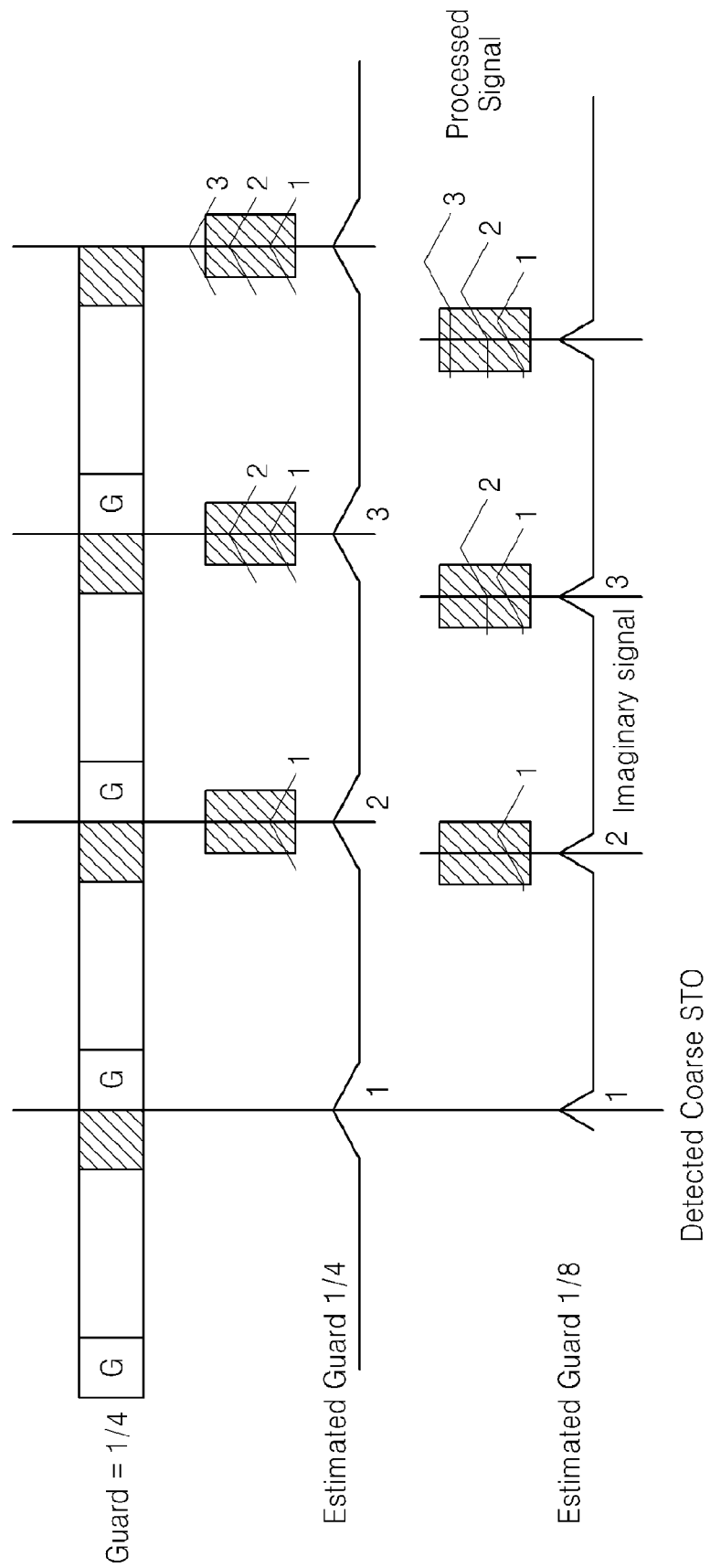
FIG. 6 is a diagram for explaining a method in which the guard mode detection unit shown in FIG. 5 detects a guard mode.

A sample counter 380 detects the STO. FIG. 6 shows a method of detecting the guard mode as a diagram. The size of each of and the number of first storage devices 320a-320d may vary with a serviced signal.

FIG. 6 is a diagram for explaining a method in which the guard mode detection unit 300 shown in FIG. 5 detects the guard mode.

Referring to FIG. 6, a signal sequence is shown, in which parts marked with G are guard symbol parts and the other parts are FFT symbol parts. Hatched portions of the FFT symbol parts are portions having the same signal waveform as a guard symbol. That is, those portions are copied and added as a guard symbol.

If a guard symbol corresponds to ¼ of the entire symbol size, it is continuously accumulated in a detected coarse STO, i.e., a start part of a detected symbol through a storage device fitted for the guard symbol size. However, if the guard symbol size is ⅛ of the entire symbol size, the guard symbol cannot be accumulated in the STO part by using the same storage device. Thus, by detecting an output of a storage device corresponding to a maximum value through accumulation, a guard mode having the corresponding guard symbol size can be detected.

Figure 7:
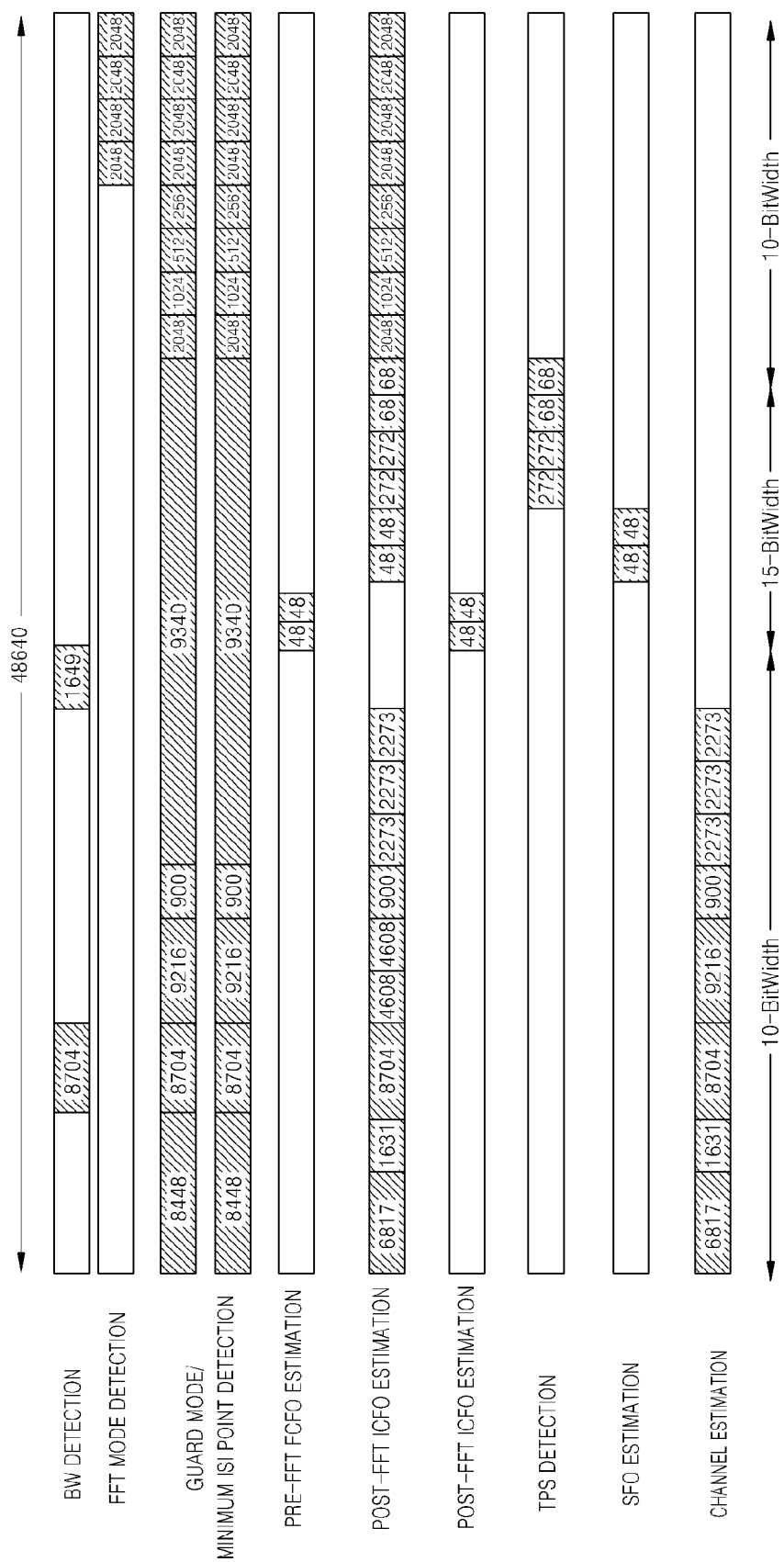
FIG. 7 is a block diagram illustrating a memory structure of a universal blind mode detector according to the present disclosure.

FIG. 7 is a block diagram illustrating a memory structure of a universal blind mode detector according to another embodiment of the present disclosure.

It can be seen from FIG. 7 that the universal blind mode detector according to the present disclosure can use a memory size capable of storing at least 48640 samples for storage devices of all detection units or estimation units. Each of the detection units or estimation units uses hatched memory portions of the memory. For example, in the case of BW (Bandwidth) detection, from the entire memory, portions having memory sizes of 8704 samples and 1649 samples are used as storage devices, respectively.

The above-described FFT mode detection unit may use four storage devices, each of which can store 2048 samples. The guard mode detection unit uses the entire memory for first storage devices, second storage devices, and STO detection of the guard mode detection unit. In FIG. 7, minimum inter symbol interference (ISI) point detection corresponds to STO detection. As can be seen from the following description, STO detection can use four storage devices of a memory rear part which store 2048 samples, 1024 samples, 512 samples, and 256 samples, respectively, and four storage devices, each storing 2048 samples, and theses storage devices can be shared between an FFT mode detector and a guard mode detector. In FIG. 7, a term "bitWidth" means a sample width of signals which are input in parallel to corresponding storage devices.

Although a BW detection unit, an FFT mode detection unit, a guard mode and minimum ISI point detection unit, a Pre-FFT fractional carrier frequency offset (FCFO) estimation unit, a Post-FFT FCFO estimation unit, a minimum ISI point detection unit, a TPS (Transmission Parameter Signaling) detection unit, an SFO (Sampling Frequency Offset) estimation unit, and a channel estimation unit are used as examples in the current embodiment, memory sizes may change if a detection unit or an estimation unit having another function is added due to a new service.

FIG. 8 is a flowchart illustrating a method of detecting a universal blind mode according to another embodiment of the present disclosure. For convenience of explanation, FIGS. 1 through 6 will be referred to.

Referring to FIG. 8, in a method of detecting a universal blind mode according to the current embodiment of the present disclosure, the RF tuner 2000 converts a received signal into a baseband frequency signal in operation S100. The host 5000 adjusts a PLL value of the RF tuner 2000 such that a central frequency can be almost 0 GHz. Next, the AGC unit 3000 determines existence of a communication service by referring to RSSI in operation S200. If the AGC unit 3000 determines that there is a communication service, the universal service mode detection unit 1000 determines of which scheme a communication service mode signal is and detects the communication service mode signal in operation S300.

Communication service mode signal detection operation S300 is performed such that the bandwidth detection unit 100 detects a bandwidth of a received signal, the host 5000 determines whether the received signal is of a DS-UWB scheme, a CDMA scheme, or an OFDM scheme, and the FFT mode detection unit 200 and the guard mode detection unit 300 detect an actual signal mode.

A bandwidth detection method or an FFT mode and guard mode detection method has already been described in detail with reference to FIGS. 2 to 6, and thus will not be described herein.

Next, the channel decoding unit 4000 performs decoding on the detected signal in operation S400. Such decoding may be Viterbi decoding or Reed Solomon decoding.

The universal blind mode detector, and the FFT mode detector, the guard mode detector, and the memory sharing structure of the universal blind mode detector, and the method of detecting a universal blind mode according to the present disclosure can detect any currently used OFDM communication signal through memory sharing, and can also detect communication signals of non-OFDM schemes such as a pulse scheme.

In addition, according to the present disclosure, by using minimum memory through memory sharing, integration of a chip can be remarkably improved, making it possible to economically manufacture portable terminals such as mobile phones to small sizes.

While the exemplary embodiments of the present disclosure has been disclosed for illustrative purposes, those skilled in the art will appreciate that various modifications and other equivalent embodiments are possible, without departing from the scope of the present disclosure as disclosed in the accompanying claims. Therefore, the true scope of the present disclosure should be defined by the technical scope of the appended claims.

What is claimed is:

1. An universal blind mode detector comprising:
a radio frequency (RF) tuner converting a received signal into a baseband frequency signal;
an automatic gain control (AGC) unit which is connected to the RF tuner and determines existence of a communication service by referring to a received signal strength indication (RSSI);
a communication service mode detection unit determining of which scheme a communication service mode signal is if the AGC unit determines that there is the communication service, and detecting the communication service mode signal; and
a channel decoding unit decoding the detected signal,
wherein the communication service mode detection unit comprises:
a bandwidth detection unit detecting a bandwidth of the received signal:
a fast Fourier transform (FFT) mode detection unit detecting an FFT mode for the received signal; and
a guard mode detection unit which is connected to the FFT mode detection unit and detects a guard mode.

2. The universal blind mode detector of claim 1, wherein the bandwidth detection unit detects the bandwidth by accumulating an output of a sliding mean with respect to a FFT output signal and determines a signal scheme.

3. The universal blind mode detector of claim 1, wherein the bandwidth detection unit comprises:
an absolute calculation unit calculating an absolute value of an FFT output signal;
a sliding mean calculating a mean of an output signal of the absolute calculation unit;

an FFT length accumulation unit accumulating an output of the sliding mean; and a bandwidth mode detection unit detecting a bandwidth based on a result of the FFT length accumulation unit.

4. The universal blind mode detector of claim 1, wherein the FFT mode detection unit performs conjugate complex multiplication and accumulation on symbols stored in serial-connected storage devices (memory), and then detects a maximum value, thereby detecting the FFT mode corresponding to a symbol size.

5. The universal blind mode detector of claim 1, wherein the guard mode detection unit sets a symbol timing offset (STO) to a predetermined value, assumes that lengths of input symbols are uniform, sums the symbols in an STO part with memory sizes of parallel-connected storage devices (memory), and then detects a maximum value, thereby detecting a guard mode corresponding to a symbol size.

6. The universal blind mode detector of claim 1, wherein the universal blind mode detector comprises a transmission unit for transmitting a transmission signal, and the transmission unit comprises:

a channel modulation unit modulating the transmission signal; and an orthogonal frequency division multiplexing (OFDM) unit for transmitting the signal modulated by the channel modulation unit according to an OFDM scheme, which includes an OFDM generation unit for performing signal modulation according to the OFDM scheme and a pulse generation unit for generating a clock signal.

7. The universal blind mode detector of claim 1, wherein the universal blind mode detector comprises a plurality of detection units and estimation units for detecting received signals, and the plurality of detection units and estimation units share a single memory for use as a storage device.

8. The universal blind mode detector of claim 1, wherein the FFT mode detector comprises:

at least two storage devices which are serially connected and store a received signal;

conjugate complex multiplication units of a number corresponding to the storage devices, which perform conjugate complex multiplication on output signals stored in the storage devices and the received signal;

accumulation units which are connected to the respective conjugate complex multiplication units and accumulate outputs of the respective conjugate complex multiplication units; and a maximum value detection unit detecting a maximum value of outputs of the accumulation units.

9. The universal blind mode detector of claim 8, wherein a maximum memory size which is a sum of memory sizes of the storage devices is larger than or equal to a maximum symbol size that can be input as the received signal, and the received signal is stored in the storage devices of a number corresponding to a symbol size.

10. The universal blind mode detector of claim 8, wherein the FFT mode detector comprises absolute calculation units which are connected to the respective accumulation units and calculate absolute values of outputs of the respective accumulation units, and the maximum value detection unit detects a maximum value among outputs of the absolute calculation units to detect an FFT mode corresponding to a symbol size of the received signal.

11. A method of detecting a universal blind mode, the method comprising:

converting a signal received by a radio frequency (RF) tuner into a baseband frequency signal;

determining existence of a communication service by referring to a received signal strength indication (RSSI) at an automatic gain control (AGC) unit connected to the RF tuner;

if the AGC unit determines that there is the communication service, determining of which scheme a communication service mode signal is and detecting the communication service mode signal at a communication service mode detection unit; and decoding the detected signal at a channel decoding unit, wherein the detecting of the communication service mode signal comprises:

detecting a bandwidth of a received signal at a bandwidth detection unit:

determining of which communication service scheme the received signal is at a host: and detecting an FFT mode and a guard mode with respect to the received signal at an FFT mode detection unit and a guard mode detection unit.

12. The method of claim 11, wherein the detecting of the bandwidth comprises detecting the bandwidth by accumulating an output of a sliding mean with respect to a FFT output signal.

13. The method of claim 11, wherein the detecting of the FFT mode and the guard mode comprises:

detecting the FFT mode corresponding to a symbol size by using serial-connected storage devices (memory); and detecting the guard mode corresponding to a guard symbol size by parallel-connected storage devices (memory).

* * * * *